April 11, 1939.  R. C. MERCER  2,153,810
FILM RACK AND HANDLING APPARATUS
Filed Jan. 18, 1937  2 Sheets-Sheet 1
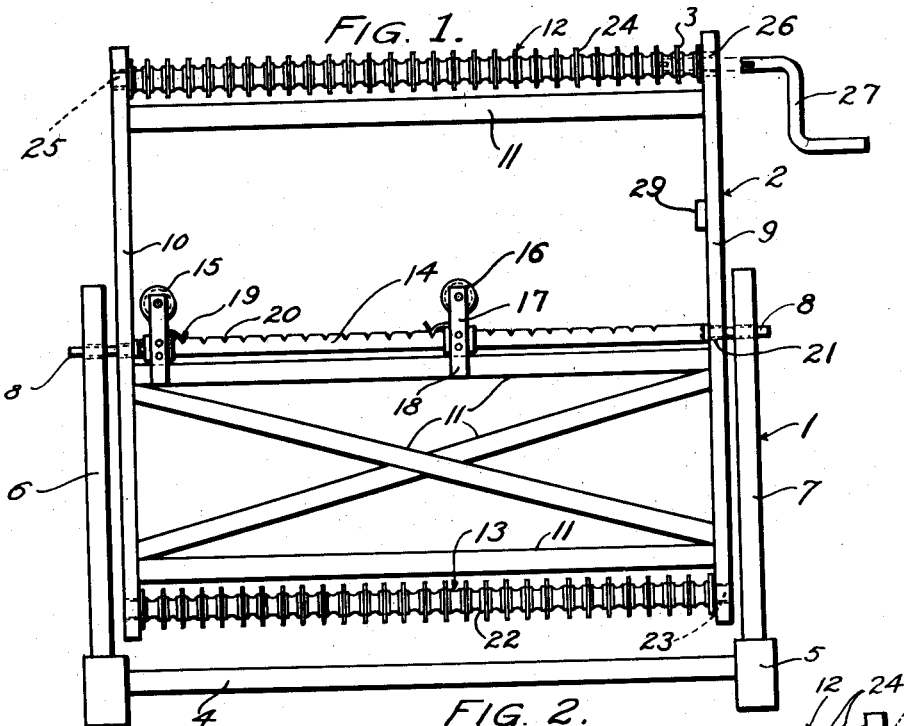
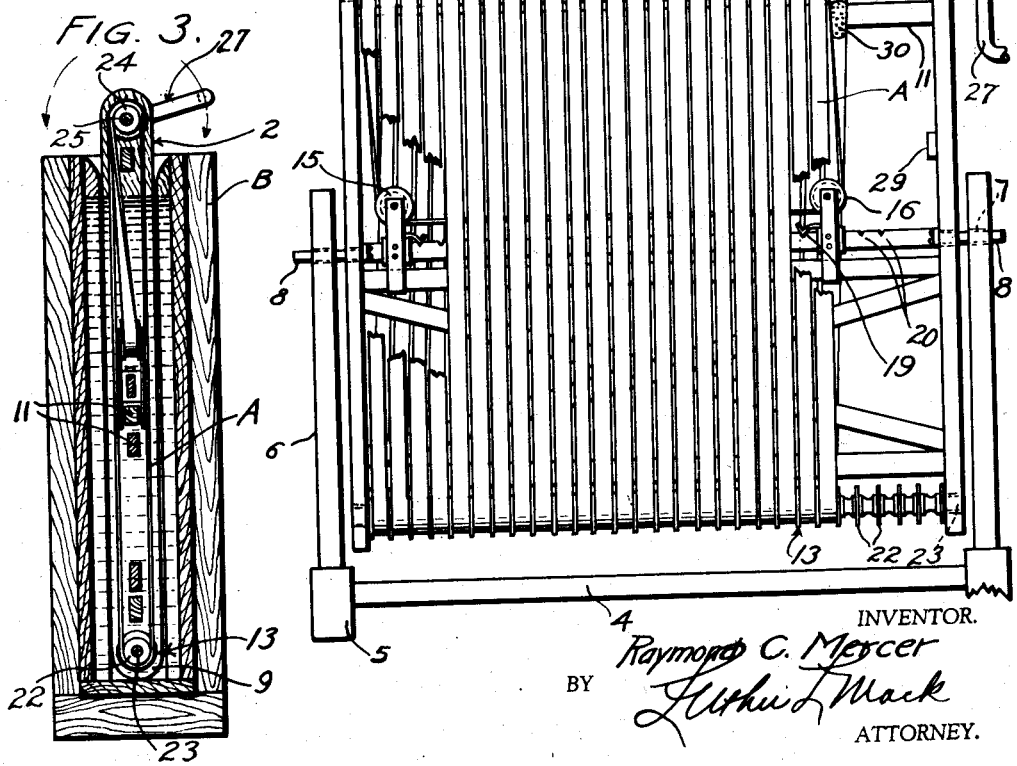
INVENTOR.
Raymond C. Mercer
BY Arthur L. Mack
ATTORNEY.

April 11, 1939. R. C. MERCER 2,153,810
FILM RACK AND HANDLING APPARATUS
Filed Jan. 18, 1937 2 Sheets-Sheet 2
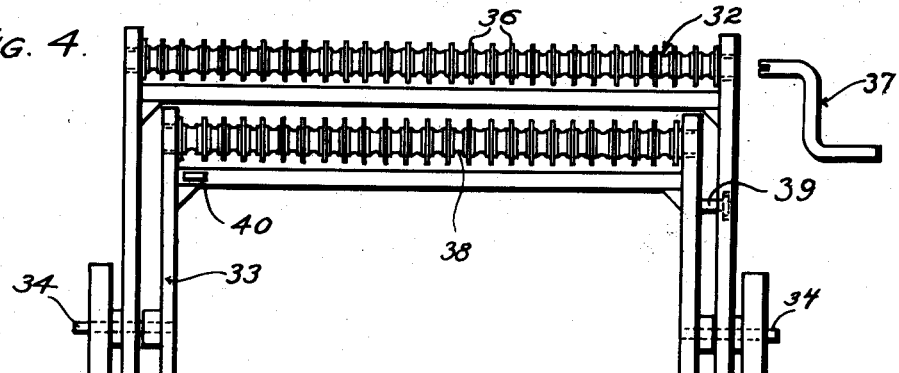
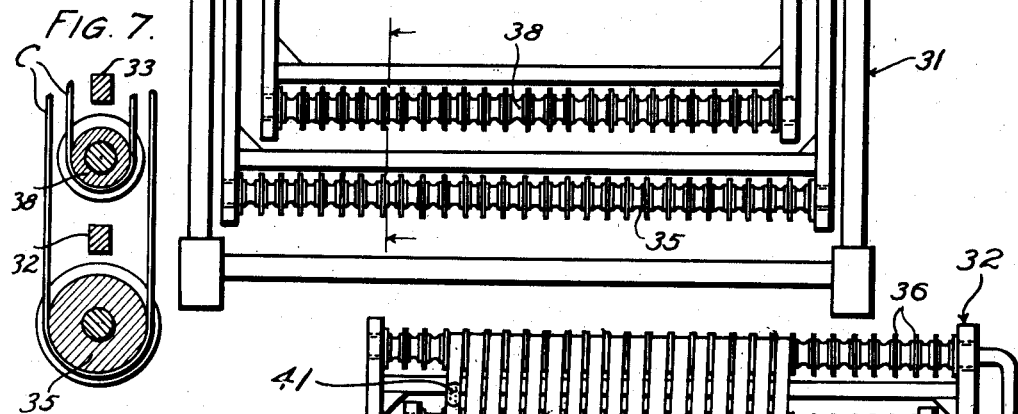
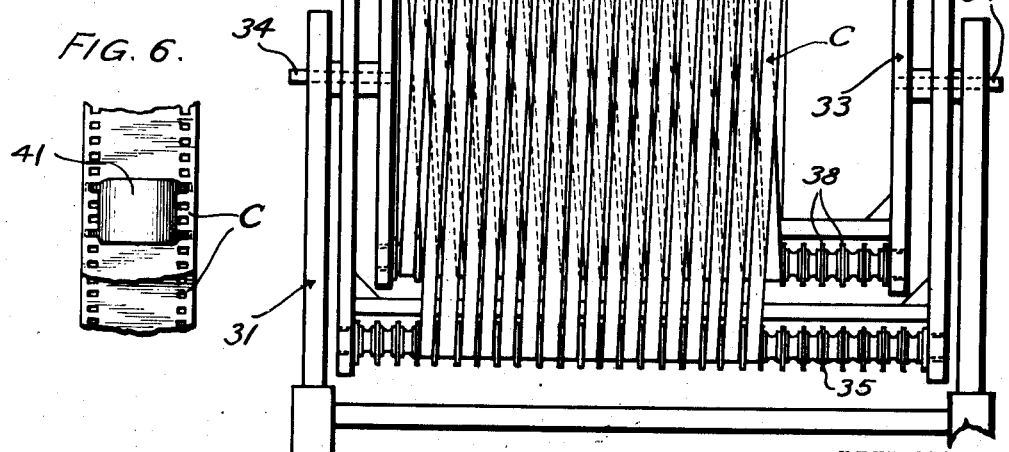
Raymond C. Mercer INVENTOR
BY Luther L. Mack
ATTORNEY Patented Apr. 11, 1939

2,153,810

UNITED STATES PATENT OFFICE 2,153,810

FILM RACK AND HANDLING APPARATUS

Raymond C. Mercer, Los Angeles, Calif.

Application January 18, 1937, Serial No. 121,181

12 Claims. (Cl. 95—100)

This invention relates to and has for an object the provision of an exceptionally efficient apparatus for handling motion picture film in such manner as to facilitate the operation of developing, fixing, washing, drying and other treatment thereof, and to prevent damaging of such film and the formation of objectionable developing streaks or other markings thereon.

Another object of this invention is to provide an apparatus of the character described in which a film rack structure will have a greater film capacity than racks as formerly used, and of comparable sizes, and wherein large quantities of film may be effectively handled for treatments, as aforesaid, with comparatively small, inexpensive apparatus, and with a saving in time.

A further object is to provide apparatus of the character described wherein a rack structure is adapted for rotation as a film winding reel and to be positioned in a developing or other treatment tank, after having film wound thereon, and includes members around which said film is maintained as an endless belt, together with means for moving said film as such a belt around said members while the rack structure is positioned in as well as removed from said tank, whereby to improve and otherwise facilitate the handling of film in the various treatments necessary for the preparation thereof.

An additional object is to provide an especially constructed rack and supporting frame therefor wherein the rack is readily operable upon the turning thereof on the frame to wind film thereon in such manner as to prevent damage thereto, and to permit the joining of the film ends to form an endless belt, the said rack being adapted for removal from the frame and for deposit in a developing tank, or the like, and including a manually rotatable means operable to effect movement in either direction at will of the endless belt of film thereon whereby to more effectively and thoroughly develop, wash, dry, fix, or otherwise treat the film.

Yet another object is to provide a film rack structure of the character described wherein a plurality of racks or rack members are arranged, one adjacent the other, for independent and simultaneous turning movement whereby to wind the film first on one and then on another thereof, and to provide for the winding of a greater length of film on a rack structure occupying no more space than a single rack, but affording much more winding surface; the film being maintained on said several racks or members as an endless belt and so movable thereon by the manually operable means included in the structure of one of the racks.

Another object of the invention is to provide a film rack of the character described which includes a novel means for effecting a duo-directional movement of an endless belt of film on said rack whereby to avoid streaking of the film as caused by uni-directional movement thereof through a film treating solution.

I have shown in the accompanying drawings a preferred form of film rack and handling apparatus embodying my invention, subject, however, to modification, within the scope of the appended claims, without departing from the spirit of my invention.

Referring to the drawings:

Fig. 1 represents a front elevation of the rack constructed in accordance with this invention;

Fig. 2 represents a front elevation of the rack shown in Fig. 1, as when having film wound thereon;

Fig. 3 is a vertical, sectional view of the rack structure as when removed from the supporting frame, and positioned within a developing tank, and showing the manner in which the film is moved as an endless belt in either direction by the manually operable means forming a part of the rack;

Fig. 4 is a front elevation of a modified form of the apparatus of this invention;

Fig. 5 is a front elevation of the apparatus shown in Fig. 4, as when having the film wound thereon, and the rack ready for removal from the supporting structure.

Fig. 6 is a fragmentary front elevation of the joined ends of the film, showing the patch for making the joint.

Fig. 7 is a sectional view taken on the plane of line 7—7 of Fig. 4.

The particular embodiment of this invention shown in the accompanying drawings generally comprises a rack supporting frame 1, a rack structure 2 rotatably and removably supported by said frame, and a means 3 included as a part of the rack structure, which, when film A is wound on the rack structure and maintained thereon as an endless belt, as shown in Fig. 2, will provide for manual rotation in either direction at will of said endless belt or film. With the film A thereon, the rack structure is adapted for ready removal from the frame 1 and may be positioned within a tank B, as shown in Fig. 3, for developing, fixing, washing, or other treatment of the film. When thus positioned, the film is movable as an endless belt in either direction by appropriate manipulation of the means 3.

As here shown, the frame 1 consists of a base member 4, cross members 5 at the ends thereof, and upright standard 6 carried by the cross members, said standards having apertures 7 at the upper ends whereby pins 8 may be inserted therethrough for rotatably and detachably supporting the rack in the frame.

One form of the rack 2, as here provided, is made up of side members 9 and 10 connected by braces 11, and having disposed between and at their ends the horizontal film supporting members 12 and 13. This forms a substantially rectangular open frame, and within the confines thereof and disposed between the side members 10 and 11 is means for assisting in the maintaining of the film in the form of an endless belt within and on the rack structure. As shown in Figs. 1, 2 and 3, this means comprises a cross bar 12 lateral adjustably supporting film pulleys 15 and 16 thereon. These pulleys are mounted in frames 17 slidable on said bar 14, and having extensions 18 which embrace and slidably engage one of the braces 11 whereby to guide and rigidly support the pulleys thereon. The pulleys are adapted to be maintained in adjusted position by means of detents 19 cooperating with notches 20 in the bar 14.

It will be noted that the members 9 and 10 are provided with apertures 21 for reception of the pins 8 so that the rack structure may be detachable and rotatably supported on the frame 1. However, any means may be employed for this purpose, provided the same affords a rotatable and detachable mounting of the rack structure in said frame, and the rack is capable of being rotated as a winding reel while thus supported.

As here shown, the member 13, at one end of the rack, is comprised of a series of flanged film supporting rollers 22 rotatably mounted on a spindle or shaft 23. The convolutions of the film wound on the rack will engage in these flanged rollers and be effectively spaced apart for developing, washing, or other treatment.

The similar means 12 at the other end of the rack consists of a plurality of rollers 24 identical with the rollers 22, but fixed on the shaft 25, which latter is rotatably supported at its ends in the members 9 and 10. This member 12 forms a part of the means 3 for manually rotating the film while supported on the rack, and, accordingly, one end of the shaft 25 is provided with a socket 26 into which an operating crank 27 is removably fitted for purposes of rotating said member 12 whereby the member 12 and crank 27 and associated elements comprise one form of the means 3, facilitating movement of the film as an endless belt while on the rack. It is to be understood that I do not wish to be limited to this particular means and may, therefore, use any means which will provide for rotation of the film as an endless belt while supported on the rack, provided that this means permits of changing the directional movement of the film at will whereby to prevent formation of development streaks, or the like, caused by one directional movement of the film through the treatment solution.

In the operation of the apparatus of this invention, the film A to be wound on the rack has one end portion temporarily fixed, as, for example, by the clip means 28, whereby on turning of the rack manually as a reel, the film will be wound thereon. This winding of the film is effected so that the portion of the film adjacent to the other end thereof may be extended back to the starting end of the rack, where it is subject to being joined with the first named and to provide an endless belt of said film. As here shown, this portion of the film adjacent to the second named end is extended under the pulleys 15 and 16 and then joined as by means of the patch 30 to the first named end, as aforesaid. The adjustment of the pulleys 15 and 16 facilitates the proper tensioning of the endless belt of film thus formed so that said belt may be rotated upon manipulation of the means 3.

After the film has been wound and joined so as to form the endless film belt on the rack, the operator may remove the pins 8 and lift the rack from the frame 1 for purposes of positioning the rack and film within the tank B, as shown in Fig. 3. By now affixing the crank 27 and turning the same so as to rotate the roller 24, the endless belt of film will be turned and thereby effectively exposed to the treatment fluid within the tank B. It is important to note that the crank 27 and associated means permits of selective rotation of the film in either direction so that the development markings or streaking usually caused by moving the film continuously in one direction are readily avoided.

It should be noted that by winding of the film on the rack around the rollers 22 and 24 and pulleys 15 and 16, with each convolution spaced from the other, handling damage or other injury of the film is prevented, and the entire film is effectively exposed, while compactly wound on the rack so as to facilitate development and other treatment thereof.

I may provide a rack structure consisting of a plurality of racks, sections or members arranged adjacent, or one within the other, and providing for a greater film capacity with little or no increase in the size of the rack, particularly no increase as to the bulk thereof or space consumed thereby. This may be accomplished by employing film holding means or rack elements within the confines of the rack proper. As shown in Figs. 4 and 5, the above noted objects are accomplished with an apparatus comprising a frame 31 identical with the frame 1 and a rack structure of which the main rack 32 is identical with the rack 2, but is adapted to maintain within its confines an auxiliary rack 33. The rack 32 is adapted to be held for rotatable and detachable support on the frame 31 by means of the removable pins 34, which pins also support on their inner ends for rotation, independent of or with the rack 32, the rack 33. On the rack 32 are the rollers 35 corresponding to the ones 22, also the rollers 36 corresponding to the ones 24 and adapted to be driven by the crank 37. The auxiliary rack 33 consists of a rectangular skeleton frame including end members made up of freely rotatable rollers 38 corresponding to the rollers 35. For purposes of locking the racks for simultaneous movement or to prevent relative movement thereof, an adjustable pin 39 carried by the main rack is movable into and out of locking engagement with the auxiliary rack, as here shown.

With the two racks arranged, as shown in Fig. 4 on the frame 31, and the pin 39 adjusted to permit of free rotation of the auxiliary rack and the crank 37 removed, the film C is first wound upon the auxiliary rack, upon appropriate turning thereof and after the usual affixation of one end portion of the film as by means of a clip 40. After the film has been wound upon the auxiliary rack from one end to the other thereof, or substantially so, the film is then extended around, for example, one of the rollers 35 of the main rack and the pin 39 then adjusted to lock the racks for simultaneous rotation. Upon now continuing the rotation of the rack structure, the film will be wound around the main rack on the rollers 35 and 36 thereof, and when fully wound the two ends of the film are secured by means of patch 41 whereby to form an endless film belt. It will now be seen that this rack structure provides relatively large film capacity without increasing the dimensions of the rack appreciably beyond that of the form of rack in the first described form of the invention. With the film wound on this modified form of rack structure, as shown in Fig. 5, said structure is subject to ready removal from the frame 31 by pulling the pins 34, and the entire unit may be disposed within a tank, as shown in Fig. 3, and upon manipulation of the crank 37, the endless length of film may be rotated around the two racks as an endless belt. As in the first described form of the invention, the film may be moved in either direction at will by appropriate manipulation of crank 37, and for the advantageous purposes hereinbefore noted.

It will now be seen that the apparatus hereinbefore described, and as shown in the accompanying drawings, will provide for objects and advantages of this invention in a particularly efficacious manner.

It should be noted that the rollers 35 and 36 of the main rack 32 are of greater diameter than the rollers 38 of the auxiliary frame, as particularly shown in Fig. 7, whereby to space the film windings from one another. It should also be noted that the rollers 22, 35 and 38 could be fixed for common rotation or arranged for separable rotation, although it has been found satisfactory to have said rollers fixed together or to the shaft for joint or common rotation.

Upon the occasion of a short strip of film or when the winding is effected in such manner that the two ends of the film are not close enough to permit of joining thereof, a leader strip or extension consisting of a suitable length of film is used to effect the necessary continued winding and the joining of said ends.

I claim:

1. Film handling apparatus comprising a substantially rectangular rack structure, means supporting said rack for rotation on a fixed axis as a film winding reel, opposed members included in said rack structure and around which film is adapted to be helically wound and joined at its ends to form an endless belt, means for moving said film as an endless belt around said members including laterally spaced rollers mounted on said opposed members and supporting individual convolutions of the film, and means for rotating the rollers on one of said opposed members.

2. Film handling apparatus comprising a rack structure, means supporting said structure for rotation about a fixed axis as a film winding reel, opposed end members included in said rack structure adapted to have film wound helically thereon to form as an endless belt, means for moving said film as an endless belt around said members including laterally spaced rollers on said end members, means for rotating the rollers on one of said end members, and an auxiliary rack movable on a fixed axis as a film winding reel within the first rack structure, and laterally spaced rollers on said auxiliary rack adapted to rotatably support helical convolutions of said endless belt of film.

3. Film handling apparatus comprising a rack structure, means for supporting said rack for rotation about a fixed axis as a film winding reel, laterally spaced rollers included in said rack structure and adapted to have the film wound helically thereon and means for moving said film as an endless belt around said rollers, said rack structure including separate racks having a common axis and disposed one within the confines of the other for relative and joint rotation on said axis.

4. Film handling apparatus comprising a rack structure, means for supporting said rack for rotation as a film winding reel and to be positioned in a developing or other treatment tank, after having film wound helically thereon, members included in said rack structure around which film is helically maintained as an endless belt, and means for moving said film as an endless belt around said members while the rack structure is positioned within as well as when removed from the tank, said members including rollers for supporting the film thereon, and pulleys adjustable on said rack structure for guiding the film across the rack structure from one end of the latter to the other.

5. Film handling apparatus comprising a rack adapted to have film wound helically thereon with the ends of the film joined to form an endless belt, and means on said rack for rotating said film as an endless belt around said rack, including opposed rows of laterally spaced rollers and means for rotating the rollers of one of said rows.

6. Film handling apparatus comprising a rack adapted to have film wound helically thereon with the ends of the film joined to form an endless belt, means on said rack for rotating said film as an endless belt around said rack, and pulleys adjustably supported on said rack and guiding portions of the film which cross the rack from one side of the coil of film thereon to the other.

7. Film handling apparatus comprising a rack adapted to have film helically coiled therearound with the ends of the film joined to form an endless belt, means on said rack for rotating said coiled film as an endless belt around said rack, a stand on which said rack is rotatably mounted, another rack supported by and within and for rotation relative to said first named rack and adapted to have portions of the film coiled helically thereon, anti-friction means engaging and supporting coils of said film on said racks, and means for releasably locking said racks against relative rotation.

8. Film handling apparatus comprising a rack adapted to have film helically coiled thereon with the ends of the film joined to form an endless belt, means on said rack for rotating said film as an endless belt around said rack, a stand on which said rack is rotatably and detachably mounted, another rack supported by and within and for rotation relative to said first named rack and adapted to have coils of said film wound helically thereon, and means for releasably locking said racks against relative rotation, said means for rotating said film including rollers carried by said racks, and manually operable means for driving certain of said rollers in either direction at will.

9. Film handling apparatus comprising a rack adapted to have film wound helically thereon with the ends of the film joined to form an endless belt, means on said rack for rotating said film as an endless belt around said rack, a stand, mounting means for detachably and rotatably mounting said rack on said stand, another rack supported in the first named rack by said mounting means for rotation relative thereto and being removable from said stand, together with said first named rack, after film has been wound helically on both said racks, means for releasably locking said racks against relative rotation, rollers mounted on the ends of the second named rack and adapted to support coils of the film, and similar rollers on one end of the first named rack for supporting coils of the film, said film rotating means including a rotary shaft carried by the first named rack, and drive rollers thereon.

10. Film handling apparatus comprising a rack having spaced opposed members adapted to have film wound helically thereon with the ends joined to form an endless belt, laterally spaced rollers on opposed members said rack and around which the coils of the film are wound, and means operable at will for rotating the rollers on one of said members in either direction to move said endless belt of film in either direction.

11. Film handling apparatus comprising a stand, a rack rotatably and removably mounted on said stand, and adapted to have film wound therearound in a plurality of helical coils so that upon joining the ends of the film an endless belt will be formed, opposed rows of laterally spaced rollers on said rack on which the coils of the belt of film are supported, and means operable at will to rotate the endless belt of film in either direction.

12. Film handling apparatus comprising a stand, a main rack removably and rotatably mounted on the stand, an auxiliary rack mounted for relative rotation within the first rack and also rotatable and removable with said first rack, said rack adapted to have film wound helically therearound and rollers on said racks for supporting the windings of said film, the rollers of the auxiliary rack being of smaller diameter than the rollers of the main rack to space the windings of film.

RAYMOND C. MERCER.